United States Patent
Moe et al.

(10) Patent No.: US 6,735,719 B2
(45) Date of Patent: May 11, 2004

(54) METHOD AND SYSTEM FOR PERFORMING LOAD TESTINGS ON SOFTWARE APPLICATIONS

(75) Inventors: Kevin LaVern Moe, Rochester, MN (US); Timothy Darold Vanderham, Alcester, SD (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 09/829,552

(22) Filed: Apr. 10, 2001

(65) Prior Publication Data

US 2002/0147942 A1 Oct. 10, 2002

(51) Int. Cl.7 ............................................. G06F 11/00
(52) U.S. Cl. ....................................................... 714/38
(58) Field of Search ............................................ 714/38

(56) References Cited

U.S. PATENT DOCUMENTS 6,167,534 A * 12/2000 Straathof et al. .............. 714/38
6,360,332 B1 * 3/2002 Weinberg et al. ............... 714/4

\* cited by examiner

*Primary Examiner*—Nadeem Iqbal
*Assistant Examiner*—Christopher Euripidou
(74) *Attorney, Agent, or Firm*—Bracewell & Patterson, LLP

(57) ABSTRACT

A method for performing load testings on software applications is disclosed. A test script is initially recorded. A location at which dynamic data are first generated within the recorded test script is then identified. Proper data correlation statements are subsequently inserted into the recorded test script. The inserted data parameters are then substituted throughout the recorded test scripts. After verifying all dynamic data have been captured and replaced, a load test is performed on a software application utilizing the recorded test script.

6 Claims, 11 Drawing Sheets

Fig. 2

```
lr_think_time( 7 );

web_submit_data("IBSUIControlServlet",
    "Action=http://localhost:8080/IBSGUI/servlet/IBSUIControlServlet",
    "Method=POST",
    "TargetFrame=",
    "RecContentType=text/html",
    "SupportFrames=0",
    "Snapshot=t6.inf",
    ITEMDATA,
    "name=#BusinessPartner#BusinessPartner",
    "value=000028A40000000300000 28A4000028A44000028A44030ABB847DC25A0F00000A000000
    ENDITEM,
    "name=action_edit",
    "value=Edit",
    ENDITEM,
    "name=PROCESS",
    "value=BusinessPartner",
    ENDITEM,
    "name=ACTION",
    "value=action_edit",
    ENDITEM,
    LAST);

web_url("IBSDefaultIEStyle.css",
```

Fig. 3

WDiff

File  Edit  View  Split  Options  Info  Help

| # | c:\mercury interactive\loadrunner\scripts\libs\bpmaintenance\bpmainter | # | c:\mercury interactive\loadrunner\scripts\libs\bpmaintenance\bpmainter |
|---|---|---|---|
| 489 | "RecContentType=text/html", | 451 | "RecContentType=text/html", |
| 490 | "SupportFrames=0", | 452 | "SupportFrames=0", |
| 491 | "Snapshot=t11.inf", | 453 | "Snapshot=t11.inf", |
| 492 | ITEMDATA, | 454 | ITEMDATA, |
| 493 | "name=#BusinessPartner#BusinessPa | 455 | "name=#BusinessPartner#BusinessPa |
| 494 | "value=10090", | 456 | "value=10030", |
| 495 | ENDITEM, | 457 | ENDITEM, |
| 496 | "name=#BusinessPartner#BusinessPa | 458 | "name=#BusinessPartner#BusinessPa |
| 497 | "value=BRUSGRAV", | 459 | "value=ABTTRANSPORT", |
| 498 | ENDITEM, | 460 | ENDITEM, |
| 499 | "name=#BusinessPartner#BusinessPa | 461 | "name=#BusinessPartner#BusinessPa |
| 500 | "value="', | 462 | "value="', |
| 501 | ENDITEM, | 463 | ENDITEM, |
| 502 | "name=#BusinessPartner#BusinessPa | 464 | "name=#BusinessPartner#BusinessPa |
| 503 | "value=Brus Gräv och Planering | 465 | "value=ABT Transport AB", |
| 504 | ENDITEM, | 466 | ENDITEM, |
| 505 | "name=#BusinessPartner#BusinessPa | 467 | "name=#BusinessPartner#BusinessPa |
| 506 | "value="', | 468 | "value="', |
| 507 | ENDITEM, | 469 | ENDITEM, |
| 508 | "name=#BusinessPartner#BusinessPa | 470 | "name=#BusinessPartner#BusinessPa |
| 509 | "value=www.brusgrav.com", | 471 | "value=www.abt.com", |
| 510 | ENDITEM, | 472 | ENDITEM, |
| 511 | "name=#BusinessPartner##PrimaryAddr | 473 | "name=#BusinessPartner##PrimaryAd |
| 512 | "value=000028A4000000003000028A4 | 474 | "value=000028A40000000030000028 |
| 513 | ENDITEM, | 475 | ENDITEM, |
| 514 | "name=#BusinessPartner##PrimaryAddr | 476 | "name=#BusinessPartner##PrimaryAd |
| 515 | "value="', | 477 | "value="', |
| 516 | ENDITEM, | 478 | ENDITEM, |
| 517 | "name=#BusinessPartner##PrimaryAddr | 479 | "name=#BusinessPartner##PrimaryAd |
| 518 | "value=Njupkarrsv. 12\r\nTYRESO", | 480 | "value=Kragsta\r\n186 24\r\n", |
| 519 | ENDITEM, | 481 | ENDITEM, |

Fig. 5

```
Virtual User Generator - [BPMaintenance1.usr - QTWeb]
File  Edit  View  Insert  Vuser  Actions  Tools  Window  Help Actions                          Action1         Contents of Action1
include "as web submit data"

Execution Log | Recording Log

*** [17] Receiving response ( 29/8/2000 13:23:28 )

<form class="IBSForm" name="BUSINESSPARTNER_DETAIL_VIEWHEADER" action
="../servlet/IBSUIControlServlet" method="POST">
<table class="IBSLayoutTableMultipart" name="Layout" width="100%"><tr
><td class="IBSLayoutHeaderCell" name="LayoutHeaderCell"><table class
="IBSHeaderTable" name="Header"><tr><td class="IBSHeaderCellLeft"> 
;</td>\n
<td class="IBSHeaderCellCenter">Business partner</td>\n
<td class="IBSHeaderCellRight"></td>\n
</tr>\n
</table>\n
</td>\n
</tr>\n
<tr><td align="center" valign="bottom"><table class="IBSDetailTable"
name="Detail"><tr><td class="IBSLabel">Id </td>\n
<td><input type="text" value="10090" class="IBSInputReadonly" name="#
BusinessPartner#BusinessPartnerId" readonly>\n For Help, press F1.                           Col:9    Line:34242   INS
```

Fig. 6

```
Virtual User Generator - [BPMaintenance1.usr - QTWeb]
File  Edit  View  Insert  Vuser  Actions  Tools  Window  Help Actions                              #include "as_web_submit_data"
                                     Contents of Action1
Execution Log | Recording Log

*** [17] Sending request ( 29/8/2000 13:23:27 )

%23BusinessPartner%23BusinessPartnerId=10090&%23BusinessPartner%23BusinessPartnerShortName
=BRUSGRAV&%23BusinessPartner%23BusinessPartnerInternalName=&%23BusinessPartner
%23BusinessPartnerLegalName=Brus+Gr%E4v+och+Planering+AB%2C+Roland&%23BusinessPartner
%23BusinessPartnerRegistrationId=&%23BusinessPartner%23BusinessPartnerURL
=www.brusgrav.com&%23BusinessPartner%23BusinessPartner%23Address=000028A4000000030000028A4000028A40000
25FBC2B463D47AEEA000000000000000000000000000000000000000000000000
000000000000000000000000000000000000000000&%23BusinessPartner%23%23PrimaryAddress
00000000000000000000000000000000000000&%23BusinessPartner%23%23AddressAddressLines
%23AddressAddressee=&%23BusinessPartner%23%23PrimaryAddress%23%23AddressPrimaryAddress
=Njupk%E4rrsv.+12%0D%0ATYRES%D6%0D%0A&%23BusinessPartner%23%23PrimaryAddress%23AddressPostalCodeLocation
%23AddressPostalCode=135+55&%23BusinessPartner%23%23PrimaryAddress%23%23Country%23%23CountryId
=Stockholm&%23BusinessPartner%23%23PrimaryAddress%23%23Country%23%23CountryDescription
=SE&%23BusinessPartner%23%23PrimaryAddress%23%23Area%23Areald=&%23BusinessPartner%23
=SWEDEN&%23BusinessPartner%23%23PrimaryAddress%23%23Area%23AreaDescription=&%23BusinessPartner%23
%23%23PrimaryAddress%23%23Area%23AreaEMailAddress=4444&%23BusinessPartner%23%23PrimaryAddress
%23AddressPhoneNumber=4444&%23BusinessPartner%23%23PrimaryAddress%23%23AddressFaxNumber
=4444&%23BusinessPartner%23%23PrimaryAddress%23%23AddressLocaleInformation
=en_US&action_contactperson=Contact+person&PROCESS=BusinessPartner&ACTION
=action_contactperson For Help, press F1.                                          Col:1      Line:34208  INS
```

Fig. 7

```
Virtual User Generator - [BPMaintenance1.usr - QTWeb]
File  Edit  View  Insert  Vuser  Actions  Tools  Window  Help Actions                    Contents of Action1
vuser_init              lr_think_time( 3 );
Action1
vuser_end                 web_submit_data("IBSUIControlServlet",
                            "Action=http://localhost:8080/IBSGUI/servlet/IBSUIControlServlet",
                            "Method=POST",
                            "TargetFrame=",
                            "RecContentType=text/html",
                            "SupportFrames=0",
                            "Snapshot=t7.inf",
                            ITEMDATA,
                            "name=#BusinessPartner#BusinessPartnerId",
                            "value=10090",
                          ENDITEM,
                            "name=#BusinessPartner#BusinessPartnerShortName",
                            "value=BRUSGRAV",
                          ENDITEM,
                            "name=#BusinessPartner#BusinessPartnerInternalName",
                            "value=",
                          ENDITEM,
                            "name=#BusinessPartner#BusinessPartnerLegalName",
                            "value=Brus Gräv och Planering AB, Roland",
                          ENDITEM,
                            "name=#BusinessPartner#BusinessPartnerRegistrationId",
                            "value=",
                          ENDITEM,
                            "name=#BusinessPartner#BusinessPartnerURL",
                            "value=www.brusgrav.com",
                          ENDITEM,
                            "name=#BusinessPartner##PrimaryAddress#Address",
                            "value=000028A400000003000028A44000028A4030ABB847DC25A0F000000A00
                          ENDITEM,
                            "name=#BusinessPartner##PrimaryAddress#AddressAddressee", For Help, press F1.                                        Col:20   Line:175   INS
```

```
web_submit_data("IBSUIControlServlet",
    "Action=http://localhost:8080/IBSGUI/servlet/IBSUIControlServlet",
    "Method=POST",
    "TargetFrame=",
    "RecContentType=text/html",
    "SupportFrames=0",
    "Snapshot=t7.inf",
    ITEMDATA,
    "name=#BusinessPartner#BusinessPartnerId",
    "value=10090",
    ENDITEM,
    "name=#BusinessPartner#BusinessPartnerShortName",
    "value=BRUSGRAV",
    ENDITEM,
    "name=#BusinessPartner#BusinessPartnerInternalName",
    "value=",
    ENDITEM,
    "name=#BusinessPartner#BusinessPartnerLegalName",
    "value=Brus Gräv och Planering AB, Roland",
    ENDITEM,
    "name=#BusinessPartner#BusinessPartnerRegistrationId",
    "value=",
    ENDITEM,
    "name=#BusinessPartner#BusinessPartnerURL",
    "value=www.brusgrav.com",
    ENDITEM,
    "name=#BusinessPartner##PrimaryAddress#Address",
    "value=000028A40000000300002BA4000028A4030ABB847DC25A0F00000",
    ENDITEM,
    "name=#BusinessPartner##PrimaryAddress#AddressAddressee",
    "value=",
```

Fig. 10

```
Virtual User Generator - [BPMaintenance1_WIP.usr - QTWeb]
File  Edit  View  Insert  Vuser  Actions  Tools  Window  Help Actions                    Contents of Action1                Action1 vuser_init    web_submit_data("IBSUIControlServlet",
Action1         "Action=http://localhost:8080/IBSGUI/servlet/IBSUIControlServlet",
vuser_end       "Method=POST",
                "TargetFrame=",
                "RecContentType=text/html",
                "SupportFrames=0",
                "Snapshot=t7.inf",
                ITEMDATA,
                "name=#BusinessPartner#BusinessPartnerId",
                "value={BusinessPartnerId}",
                ENDITEM,
                "name=#BusinessPartner#BusinessPartnerShortName",
                "value={BusinessPartnerShortName}",
                ENDITEM,
                "name=#BusinessPartner#BusinessPartnerInternalName",
                "value=",
                ENDITEM,
                "name=#BusinessPartner#BusinessPartnerLegalName",
                "value={BusinessPartnerLegalName}",
                ENDITEM,
                "name=#BusinessPartner#BusinessPartnerRegistrationId",
                "value=",
                ENDITEM,
                "name=#BusinessPartner#BusinessPartnerURL",
                "value={BusinessPartnerURL}",
                ENDITEM,
                "name=#BusinessPartner##PrimaryAddress#Address",
                "value={BusinessPartnerAddressHandle}",
                ENDITEM,
                "name=#BusinessPartner##PrimaryAddress#AddressAddressee",
                "value=", For Help, press F1.                                    Col:23   Line:225   INS
```

METHOD AND SYSTEM FOR PERFORMING LOAD TESTINGS ON SOFTWARE APPLICATIONS

BACKGROUND OF THE INVENTION

1. Technical Field

The present invention relates to a method and system for testing in general, and in particular to a method and system for testing software applications. Still more particularly, the present invention relates to a method and system for performing load testings on software applications.

2. Description of the Prior Art

Load testing is a process by which a software application is tested under stress (or load) as the software application will be experiencing during real-time operation environment. Load testing is one of the final testing steps before a software application can be shipped to customers. As such, it is crucial to test the software application in a fashion similar to the manner that the software application will be used in the operation environment of the customers. Hence, a test engineer needs to understand how a human user would use the software application, and then devises a method on how the human usage can be automated through the use of a software testing tool, such as LoadRunner manufactured by Mercury Interactive.

For a load test to be valid, the software testing tool needs to be able to process each step similar to a human user, which requires randomly selecting items from a software application based upon what is returned from a server. For example, in order to test an internet-based software application just as it would be used in an operation environment of customers, the software testing tool must be able to take data that is returned from a web server and uses the data to submit requests similar to a human user would do with the software application. If a load test is performed without using live dynamic data, then the load test is probably invalid because the software application is not being stressed as the software application would be in an actual working environment. Many load tests are not very realistic in that aspect because they only call up application pages that are static. Consequently, it would be desirable to provide an improved method and system for performing load tests on software applications.

SUMMARY OF THE INVENTION

In accordance with a preferred embodiment of the present invention, a test script is initially recorded. A location at which dynamic data are first generated within the recorded test script is then identified. Proper data correlation statements are subsequently inserted into the recorded test script. The inserted data parameters are then substituted throughout the recorded test scripts. After verifying all dynamic data have been captured and replaced, a load test is performed on a software application utilizing the recorded test script.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 2–10 are screen displays depicting various stages of load testings, in accordance with a preferred embodiment of the present invention.

DESCRIPTION OF A PREFERRED EMBODIMENT

The present invention may be executed in a variety of computers under a number of different operating systems. The computer may be, for example, a personal computer, a midrange computer or a mainframe computer. In addition, the computer may be a stand-alone system or part of a network such as a local-area network (LAN) or a wide-area network (WAN).

Figure 1:
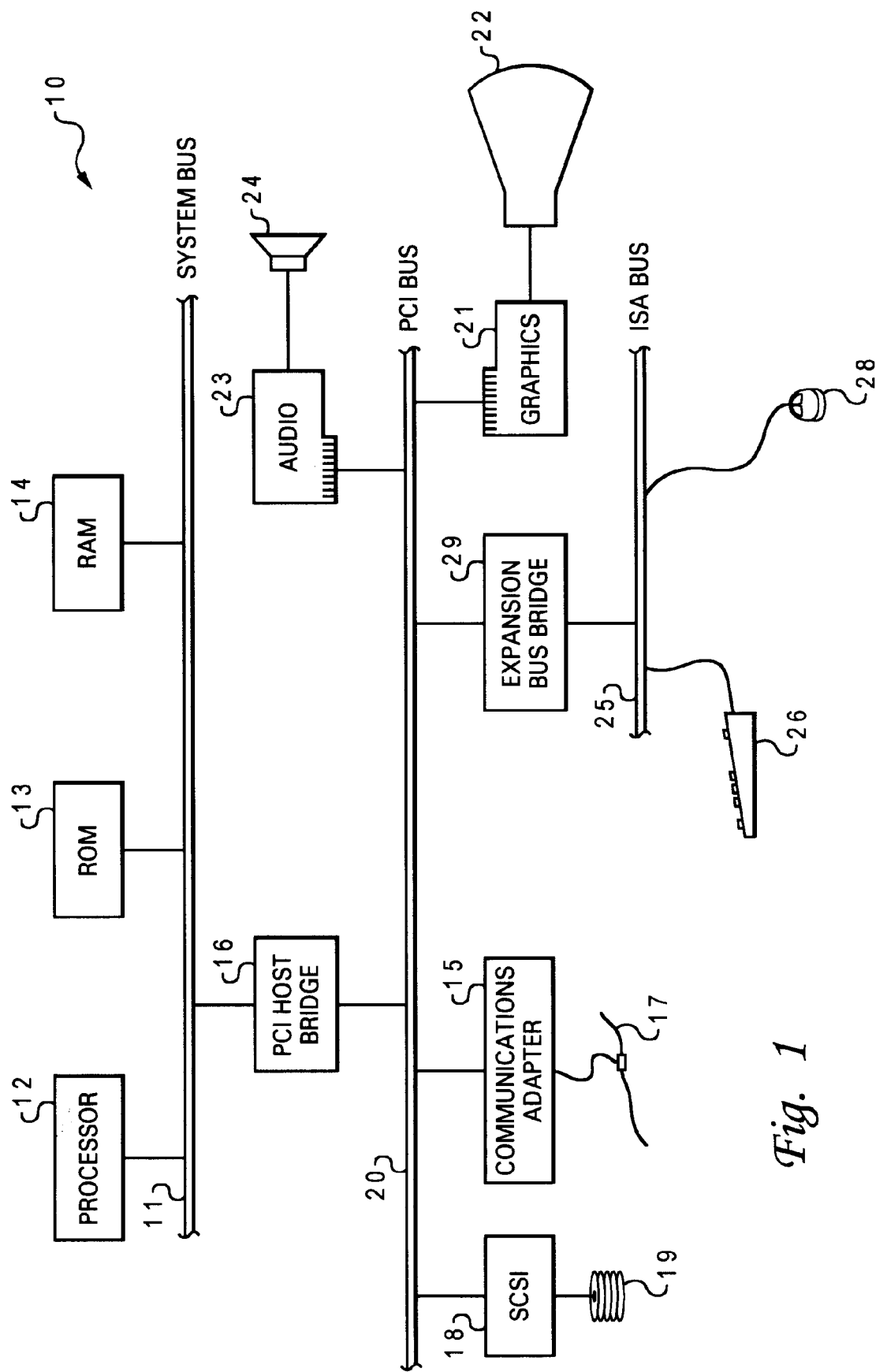
FIG. 1 is a block diagram of a computer system in which a preferred embodiment of the present invention is applicable.

Referring now to the drawings and in particular to FIG. 1, there is depicted a block diagram of a computer system 10 in which a preferred embodiment of the present invention is applicable. As shown, a processor 12, a read-only memory (ROM) 13, and a random access memory (RAM) 14 are connected to a system bus 11. Processor 12, ROM 13, and RAM 14 are also coupled to a peripheral component interconnect (PCI) bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path allowing PCI devices to directly access RAM 14. In addition, an audio adapter 23 and a graphics adapter 21 may be attached to PCI bus 20. Graphics adapter 21 controls visual output through a video monitor 22 and audio adapter 20 controls audio output through a speaker 24. Also attached to PCI bus 20 is a communications adapter 15 and a small computer system interface (SCSI) 18. Communications adapter 15 connects computer system 10 to a local-area network (LAN) 17. SCSI 18 is utilized to control a high-speed SCSI disk drive 19. Expansion bus bridge 29, such as a PCI-to-ISA bus bridge, may be utilized for coupling an industry standard architecture (ISA) bus 25 to PCI bus 20. As shown, a keyboard 26 and a mouse 28 are attached to ISA bus 25 for performing certain basic I/O functions.

A realistic load test for an internet server-based software application would allow the load test to generate entries, to execute specific queries that actually open database records, and to modify any randomly chosen records. Correlation of dynamic data is required in order to perform such realistic load test.

The following is a very simple example for showing the principle of how correlating dynamic data works. After a human user displays a web page that has a list of 30 customers, the human user then wants to be able to randomly select what customer record to change. All those 30 customers are represented in the persistent data stored by a handle, and if the human user is not able to determine the handle of a certain customer, then the human user will not be able to modify that record. Therefore, when the records are returned from the server, the software testing tool captures the data and assigns the data to parameters that are defined by a test engineer. When the human user select a customer record to work on, the human user submit his/her request with this parameter passed into the call, so that the server recognizes what record the human user is working with.

Without the ability to correlate dynamic data, the test engineer can only test a software application with only one piece of data from the server. That value becomes static and the test engineer either have to manually create a file with all the possible values for the software application or just test with only one piece of data. Neither one of the two solutions is acceptable when comes to load testing a software application. A software testing script needs to be robust enough to run virtual users, which will be simulating the work of hundreds of actual users. Without the ability to correlate dynamic data, the test engineer loses the ability to fully test the scalability of a software application, which is the case with enterprise Java applications, such as those built using San Francisco and WebSphere manufactured by International Business Machines Corporation of Armonk, N.Y. Another reason for correlating dynamic data is to ensure that test scripts will be able to properly test a software application on any server installation of the software application. Every installation of a internet server-based application could have different handles for the entities, and the number of entities constantly changes.

LoadRunner Virtual User Generator (VUGen) and Wdiff tool are utilized to illustrate a preferred embodiment of the present invention. Listed below are the steps for performing a load test, in accordance with a preferred embodiment of the present invention.

Step 1: Record Two Identical Test Scripts

The first step is to use VUGen to generate two identical test scripts that perform the same process but different information are selected. It is very important to follow the same steps for each test script, so that no other factors are introduced. The current step allows a test engineer to determine what data in a software application is dynamic during the next step.

Using a web page having 34 customers in a list as an example, the first test script may describe a human user modifying data from a first customer after the first customer has been selected from the list. The second test script may describe the human user modifying data from a second customer after the second customer has been selected from the list. Both modifications are the same. An example of what the two test scripts may look like is shown in FIG. 2. Both test scripts should have the same web submit data command but the handle values are different.

Step 2: Identify the Differences Between the Two Test Scripts

The next step is to identify the areas of the two test scripts that are different from one another. Any line-by-line differences between the two test scripts can be shown using the Wdiff tool. This step allows the test engineer to know exactly what lines of the test script have dynamic data and the data that needs to be correlated in order for the test script to perform the work of a human user. The Wdiff tool can be found in a BIN directory under the root directory of the Mercury Interactive installation.

The differences between the two recorded test scripts are indicated in highlighted lines depicted in FIG. 3. There are several differences that deal with the customer data, such as the ID and name. There is also a 256-character handle in each test script with different values. All of those data needs to be correlated such that proper data will be used for each customer.

Step 3: Mark the Dynamic Data in the Test Scripts

Figure 4:
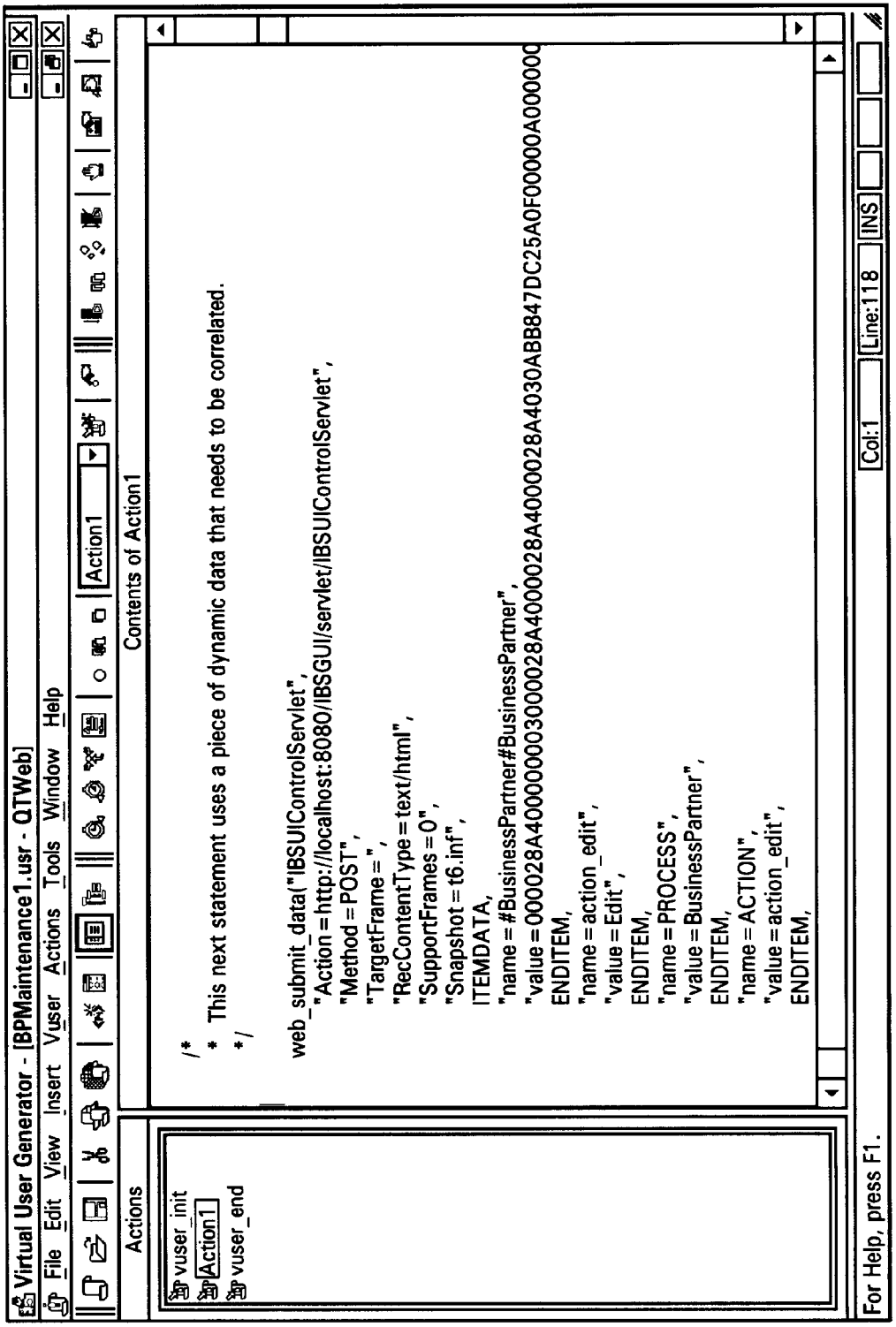

Once the Wdiff tool is used to identify what lines in the script contain data that needs to be correlated, comments should be inserted in the test script before every statement that contains dynamic data, as shown in FIG. 4. The insertion of comments ensures that all the needed data have been correlated, and none of the required fields is missed.

Step 4: Identify Where the Dynamic Data is First Generated in the Test Script

This is a critical step in the process because without the ability to identify where the dynamic data is being generated, anything can be captured. The time when the data is being generated by the server can be identified by using a recording log. The recording log is part of the VUGen and is associated with the test script. The recording log is generated during the recordation of the test script. The recording log captures all of the data communicated between a client and the server. Recording logs for a standard test script are normally around 100,000 lines long, but may be longer for more complex test scripts.

A recording log shows the exact forms that are returned from a server and also the exact calls requested from a client. The first occurrence of dynamic data needed to be captured from the test script should be located in a recording log. It is very important make sure that the data is found in a receiving response section of the recording log (see FIG. 5) because this should be the place where the data can be captured. From there, the test engineer can find out which client request generated the receiving response. If the test engineer is familiar with the application software, the test engineer will most likely know where such client request would be in the test script. If not, the test engineer will have to locate it in the test script by utilizing the sending request section of the recording log (see FIG. 6). FIG. 7 shows what part of the test script actually makes the call that is shown in FIG. 6. Although the sending request section in the recording log shown in FIG. 6 does not resemble the test script shown in FIG. 7, they correspond to one another. A comment should then be placed in the test script indicating that the subsequent statement invokes a response with dynamic data. The corresponding line number should also be inserted in the recording log so the test engineer can quickly find this data. Step 4 should be repeated until all the data that needs to be correlated are found. There may be several pieces of data that need to be captured at the same time or in the same place. For example, the customers name, customer identification, address, telephone number, and account code may need to be captured from one response.

One way to verify that the proper data have been captured is to run the test script having extended logging turned on with parameter substitution. When LoadRunner captures the data, the captured data will be shown in the execution log. This is a quick and easy way to determine if the parameters have the proper data assigned to them. The test script must be working with parameter substitution before going to the next step.

Step 5: Implement the Proper Data Correlation Statements into the Script

Figure 8:
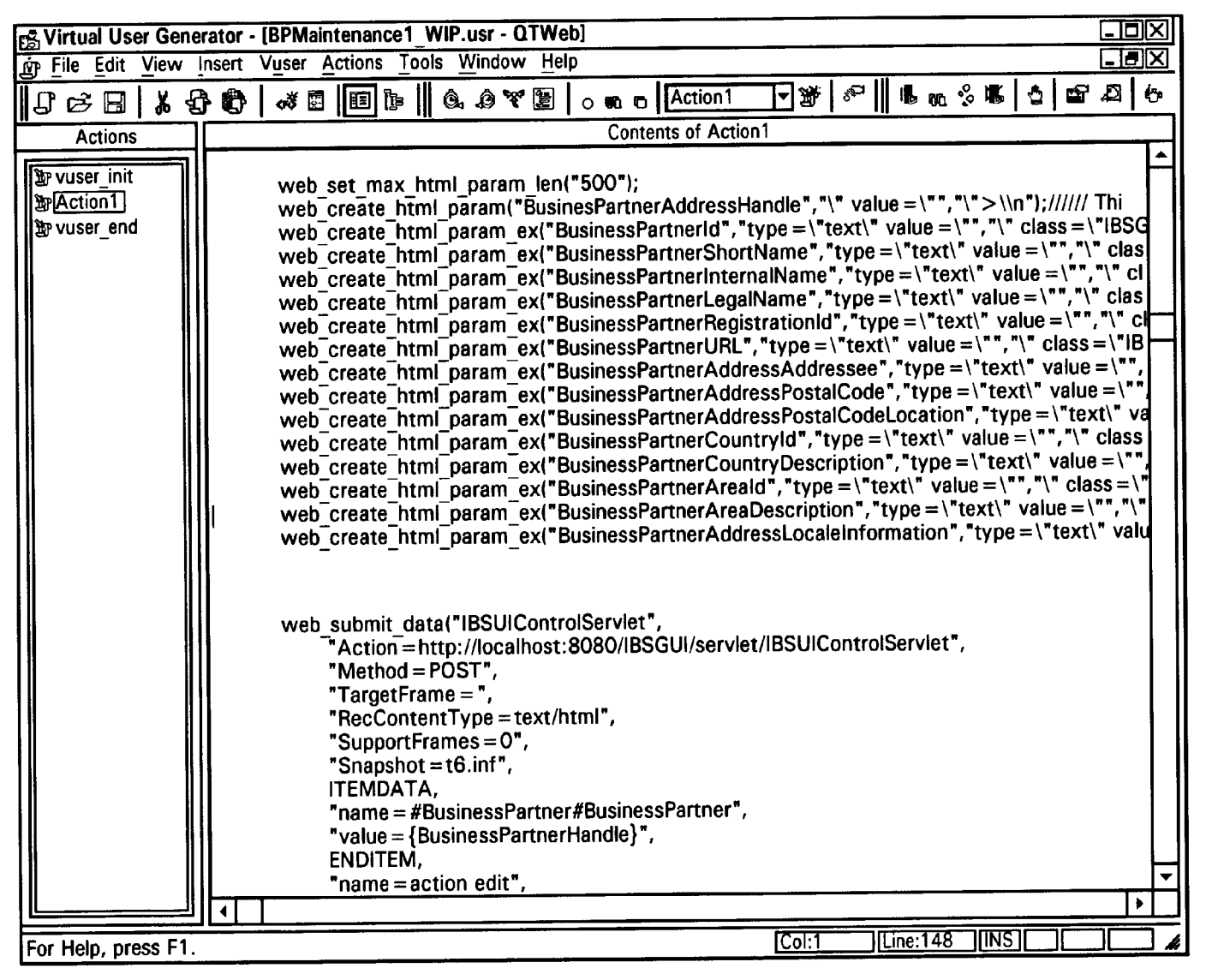

Now that the location of the dynamic data in the test script has been identified, the test engineer is ready to begin modifying the test script with parameters. LoadRunner commands can now be added to the test script for capturing dynamic data from the server responses to the client requests. Standard LoadRunner functions that can be used are web_create_html^param and web_create_html^param_ex. Full details on those functions can be found in the LoadRunner documentation, the pertinent of which is incorporated herein by reference. Generally speaking, both functions employ a user specified left and right boundary to find the data the user wants to capture. Both functions then assign the data to a parameter for later use within the test script. The second function is used when the test engineer needs to capture multiple pieces of data from a single response. The test engineer needs to specify what instance of the left and right boundaries the test engineer would like to use for capturing purposes. These functions must be implemented prior to the client request that will invoke the server response containing the data the test engineer would like to capture. If the boundaries are not found, the function is not carried to the next client request. It is only valid for one request. FIG. 8 provides an example of how such statements can be implemented.

Step 6: Substitute the Data Parameters Throughout the Test Script

After all the correlation functions added to the script have been obtained, the test engineer is ready to substitute all the parameters in throughout the script. This is also the step where the test engineer refer back to the recording log if the test engineer does not know exactly where the data is being used. The test engineer can locate where the data is being used in a client request, proceeds to find that request in the test script, and then substitutes the proper parameters. FIG. 9 depicts the original test script, and the test script with substituted parameters is shown in FIG. 10.

Step 7: Verify that All the Dynamic Data has been Captured and Replaced

This step is where the test engineer needs to verify that all the data has been captured properly and substituted properly. The way to do this is to run the script and then look at the execution log to make sure no errors occurred and that all the correlation steps completed successfully. The test engineer should also manually verify that everything worked in the software application as expected. Afterwards, the test script is ready to be for the purpose of software testing.

Figure 11:
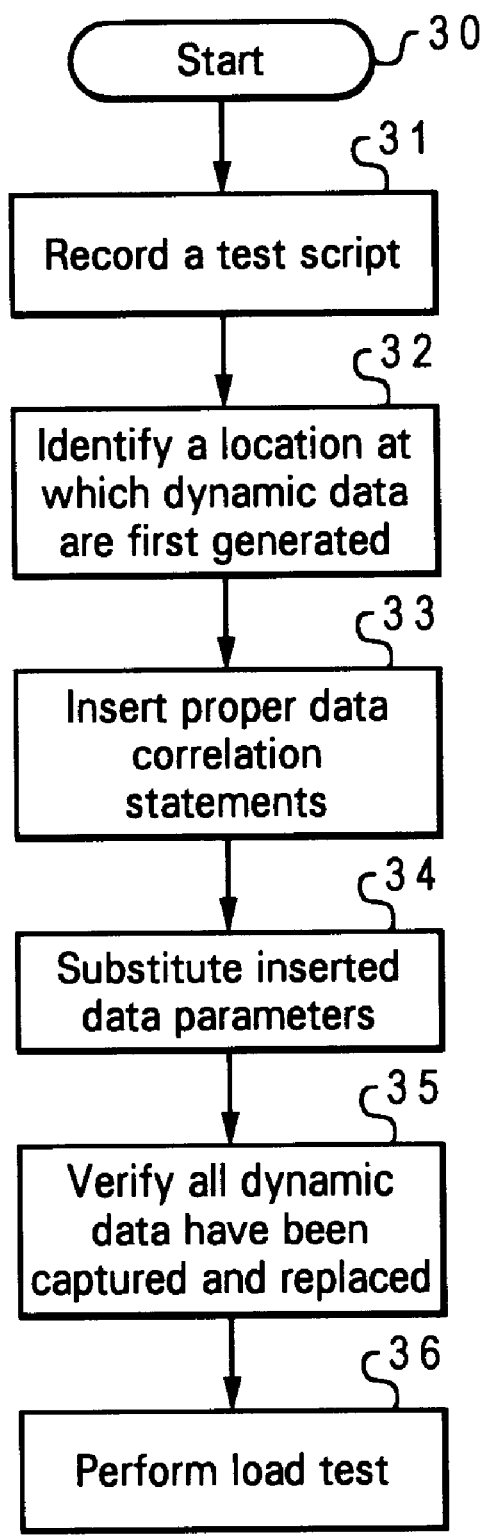
FIG. 11 is a high-level logic flow diagram illustrating a method for performing load tests, in accordance with a preferred embodiment of the present invention.

Referring now to FIG. 11, there is depicted a high-level logic flow diagram illustrating a method for performing load tests, in accordance with a preferred embodiment of the present invention. Starting at block 30, a test script is initially recorded, as shown in block 31. A location at which dynamic data is first generated within the recorded test script is then identified, as depicted in block 32. Proper data correlation statements are subsequently inserted into the recorded test script, as illustrated in block 33. The inserted data parameters are then substituted throughout the recorded scripts, as shown in block 34. After verifying all dynamic data has been captured and replaced, as depicted in block 35, a load test is performed on a software application utilizing the recorded test script, as illustrated in block 36.

As has been described, the present invention provides an improved method and system for performing load tests on software applications. Specifically, the present invention provides a preferred method for performing load tests on software applications that contain dynamic data. The present invention solves the problem of having a load test that can only be performed using static or false data. The present invention also gives the flexibility to test all parts of a software application running concurrently. As such, the present invention allows a test engineer to run multiple users simultaneously doing the same task.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for performing a load test on a application software in which dynamic data are required to be correlated, said method comprising:

recording a test script;

identifying a location at which dynamic data are first generated within said recorded test script from a recording log;

inserting proper data correlation statements into said recorded test script;

substituting inserted data parameters throughout said recorded test scripts;

verifying that all of said dynamic data have been captured and replaced; and performing a load test on a software application utilizing said recorded test script.

2. The method of claim 1, wherein said recording is performed utilizing VUGen.

3. The method of claim 1, wherein said recording is performed utilizing a recording log associated with said recorded test script.

4. The method of claim 1, wherein said substituting is performed utilizing LoadRunner functions web_create_html^param and web_create_html^param_ex.

5. The method of claim 1, wherein said recording further includes recording a test script and an identical copy of said test script, wherein said recorded test script and said recorded identical copy of said test script perform the same process but different information are selected.

6. The method of claim 5, wherein said identifying further includes identifying differences between said recorded test script and said recorded identical copy of said test script by using highlighted lines.

* * * * *